(12) United States Patent
Müller

(10) Patent No.: US 6,194,795 B1
(45) Date of Patent: Feb. 27, 2001

(54) TRANSFORMER CONFIGURATION

(75) Inventor: Walter Müller, Uffing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/160,869

(22) Filed: Sep. 25, 1998

Related U.S. Application Data

(63) Continuation of application No. PCT/DE97/00543, filed on Mar. 17, 1997.

(30) Foreign Application Priority Data

Mar. 29, 1996 (DE) .............................. 196 12 744

(51) Int. Cl.$^7$ .................................................. H02J 3/06
(52) U.S. Cl. ............................................................ 307/83
(58) Field of Search ........................................ 307/17, 83

(56) References Cited

U.S. PATENT DOCUMENTS

| | | | |
|---|---|---|---|
| 4,626,697 | * 12/1986 | Nelson | 307/17 |
| 4,777,380 | * 10/1988 | Wathelet | 307/41 |
| 4,906,859 | * 3/1990 | Kobayashi et al. | 307/17 |

FOREIGN PATENT DOCUMENTS

| | | |
|---|---|---|
| 1 941 047 | 3/1970 | (DE) . |
| 43 43 929 A1 | 6/1995 | (DE) . |
| 0 152 002 A1 | 8/1985 | (EP) . |
| WO97/37419 | * 10/1997 | (WO) ............... H02J/03/06 |

OTHER PUBLICATIONS

International Application WO 94/27351 (Pelletier et al.), dated Nov. 24, 1994.
R.J. Nelson: "Transmission Power Flow Control: Electronic vs. Electromagnetic Alternatives For Steady–State Operation", 8047c IEEE Transactions on Power Delivery, 9(1994) Jul., No. 3, New York.
"Power Electronics: An Effective Tool for Network Development? An Electricite De France Answer Based on the Development of a Prototype Unified Power Flow Controller" (Daniel et al.), EDF Service ERMEL, France.
"The Unified Power Flow Controller: A New Approach to Power Transmission Control" (Gyugyi et al.), IEEE Transactions on Power Delivery, vol. 10, No. 2, Apr. 1995.

* cited by examiner

Primary Examiner—Fritz Fleming
(74) Attorney, Agent, or Firm—Herbert L. Lerner; Laurence A. Greenberg; Werner H. Stemer

(57) ABSTRACT

In a transformer configuration for controlling the energy flow in electrical transmission lines, an auxiliary transformer is provided. The auxiliary transformer is subdivided by one of its windings into two partial windings with a center tap. One of the partial windings is connected into each of the transmission lines, and the center tap forms a network node. This results in the transformer configuration having reduced dimensions of the throughput rating compared with prior art configurations.

20 Claims, 3 Drawing Sheets

TRANSFORMER CONFIGURATION

CROSS-REFERENCE TO RELATED APPLICATION

This is a continuation of copending International Application PCT/DE97/00543, filed Mar. 17, 1997, which designated the United States.

BACKGROUND OF THE INVENTION

Field of the Invention:

The invention relates to a transformer configuration for feeding additional voltage to transmission lines. More specifially, to a transformer configuration having an auxiliary transformer connected in series with a transmission line and supplied with energy by an exciter transformer.

To control the energy flow on an electrical energy transmission line, such as a high-voltage line, so-called diagonal or auxiliary transformer configurations are used as needed. In them, longitudinal and/or transverse voltages or currents of arbitrary phase relationship are coupled into the transmission line.

Such a configuration as a rule includes an auxiliary transformer, connected by at least one of its windings into the transmission line and supplied with energy via an exciter transformer. The two transformers, typically also called a transformer unit, can be connected to one another via a control member, such as a converter or a converter set. Such a configuration is known for instance from Published, Non-Prosecuted German Patent Application DE 43 43 992 A. Such configurations are also known in the literature as UPFCs (unified power flow controllers).

In the configurations known in the prior art, the throughput rating of the total configuration, which is definitive for the dimensions, is the product of the maximum network current multiplied by the maximum additional voltage. In the limit case, in which the current on a parallel, uncontrolled transmission line is equal to zero and the total current flows via the controlled transmission line, the full throughput rating must be brought to bear by the auxiliary transformer.

SUMMARY OF THE INVENTION

It is accordingly an object of the invention to provide a transformer configuration which overcomes the above-mentioned disadvantages of the prior art devices of this general type, in which a transformer configuration for controlling energy flow in at least two interconnected transmission lines is provided and control the of both transmission lines is achieved at little effort or expense. With the foregoing and other objects in view there is provided, in accordance with the invention, in combination with transmission lines including a first transmission line and a second transmission line, a transformer configuration for feeding an additional voltage into the transmission lines, including: auxiliary transformer having a winding with a center tap being a network node, the center tap dividing the winding into a first partial winding and a second partial winding, the first partial winding connected in series with the first transmission line and the second partial winding connected in series with the second transmission line; and an exciter transformer supplying energy to the auxiliary transformer.

According to the invention, the object is attained with a transformer configuration feeding an additional voltage into a first transmission line for electrical energy. The configuration has an auxiliary transformer that can be connected in series by at least one of its windings with the first transmission line and supplied with energy via an exciter transformer. The configuration has a winding with a center tap that divides the winding into two partial windings, and in which, to connect the first transmission line to a second transmission line, one partial winding can be connected in series with the first transmission line and the other partial winding can be connected in series with the second transmission line, in such a way that the center tap forms a network node.

In this simple way, the energy flow over both transmission lines can be controlled simultaneously, with the controllability for both transmission lines being coupled. No additional devices are needed. For limit cases in which only one of the partial windings has a maximum current Ig flowing through it at a time, the definitive throughput rating P for the transformer configuration is in accordance with the equation $$P = 0.5 \times Ig \times Uz,$$

where Uz designates the additional voltage. In any other current allocation, a power transfer of the in-phase current components takes place between the partial windings that are not loading the exciter transformer. When there is the same current on both transmission lines, the transformer configuration is in the idling mode, regardless of the requisite additional voltage. The center tap, for carrying energy onward, can be connected to a network or to a transmission line leading onward.

A third and fourth transmission line may also be provided, which are likewise connected to one another via respective partial windings of a second auxiliary transformer. The center tap of both auxiliary transformers can be connected to one another and form a network node. This forms a kind of controlled network node, and a power flow between arbitrary pairs of lines can be adjusted.

Advantageously, both auxiliary transformers can be supplied with energy via the same exciter transformer. This keeps the expense and effort involved in the exciter circuit low. Alternatively, the auxiliary transformers can be supplied with energy via separate exciter transformers. Once again, this allows a favorable setup and completely independent control.

The center tap or taps can be connected to the high-voltage side of the exciter transformer. The exciter transformer can thus be operated independently of the voltage on the transmission lines. This is especially favorable in the event of a failure.

It is advantageous if the exciter transformer acts as a machine transformer and if a generator can be connected to its winding on the low-voltage side. The exciter transformer thus performs a dual function. Depending on the construction of the transformer configuration, it is thus possible to dispense with one transformer.

It is favorable if a control member can be connected between each auxiliary transformer and its associated exciter transformer. This enables especially good adjustment of the energy flow.

The control member advantageously acts as a converter configuration here. This makes good control performance attainable. Semiconductor valves, such as thyristors, in the form of current inverters are preferably employed.

The converter configurations may have an equal-energy intermediate circuit, in particular a direct-current or direct-voltage intermediate circuit. As a result, the energy source and the actual exciter circuit are decoupled from one another.

The transformer configuration preferably has a number of phases equal to the number of phases of the transmission lines. The preferred application is for rotary current networks, especially three-conductor rotary current networks.

The center tap(s) may have a pickup at approximately 50% of the total number of windings, or some other value. In this way, either symmetrical or asymmetrical partial windings are formed depending on the demands of the network.

Other features which are considered as characteristic for the invention are set forth in the appended claims.

Although the invention is illustrated and described herein as embodied in a transformer configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The embodiments described below are shown by way of example in a unipolar basic illustration. It is understood that they can also be made in multiphase and in particular three-phase fashion, depending on the number of phases of the networks or transmission lines connected to them.

Figure 1:
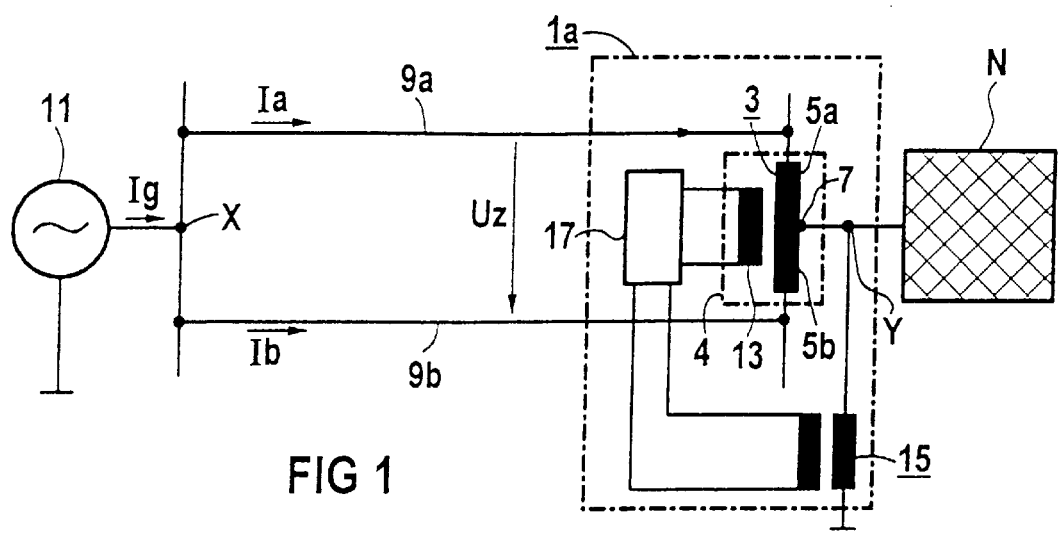
FIG. 1 is a block circuit diagram of a first transformer configuration according to the invention.

Referring now to the figures of the drawing in detail and first, particularly, to FIG. 1 thereof, there is shown a first transformer configuration 1a. The first transformer configuration 1a has a first winding 3 on a high-voltage side of an auxiliary transformer 4 and the first winding 3 is subdivided into two partial windings 5a and 5b. The connecting point between the two partial windings 5a, 5b forms a center tap 7. The two partial windings 5a, 5b are each connected in series with a respective electrical transmission line 9a and 9b. The transmission lines 9a, 9b are connected to one another by their free ends and are connected to a network or, as shown by example here, to a generator 11, thereby forming a network node X.

The center tap 7 forms a network node Y, which can be connected to a further network N, a consumer, or other electrical devices.

To control the energy flow to the two transmission lines 9a, 9b, an additional voltage or additional current must be applied by the first winding 3. To that end, the auxiliary transformer 4 has a low-voltage or intermediate-circuit winding 13, which is supplied with energy by an exciter transformer 15. For precise control of the energy flow, a control member 17 is provided, which may be embodied for instance as an off-load tap changer, or as a converter configuration with controlled valves, and in particular as a current converter.

With the first transformer configuration 1a, the energy flow to the high-voltage transmission lines 9a, 9b can be controlled. It is also optionally possible to connect an energy flow controller to a protective monitor of the high-voltage line, so that operation is still possible at reduced transmission power in the event of a failure, for instance, or that auxiliary operation or error correction is possible for instance without total failure of a line.

The center tap 7 on the auxiliary transformer 4 for the symmetrical situation divides the winding power in half with regard to the exciter transformer 15, the control member, and the low-voltage or intermediate-circuit winding of the auxiliary transformer 4.

To control the current distribution in the annular network formed by the transmission lines 9a, 9b, the full additional voltage Uz is available. In the limit cases, in which the current Ia or Ib on one of the lines is equal to the total current Ig (that is, if Ia=Ig, or if Ib=Ig), only one of the partial windings 5a or 5b has current flowing through it. For the dimensioning of the overall transformer configuration, the throughput rating thus becomes ½×Uz×Ig.

In any other current distribution, a power transfer of the in-phase current components takes place between the partial windings 5a, 5b that do not load the exciter transformer 15 and the control member 17. If Ia=Ib, the first transformer configuration 1a is in the idling mode, regardless of the additional voltage Uz required for that purpose.

It is understood that the nodes X and Y can also trade places in terms of their functions as a feeder node or a tapping node. The exciter transformer 15 draws its energy optionally from a further network, some other energy source, or as shown from the node Y.

Figure 2:
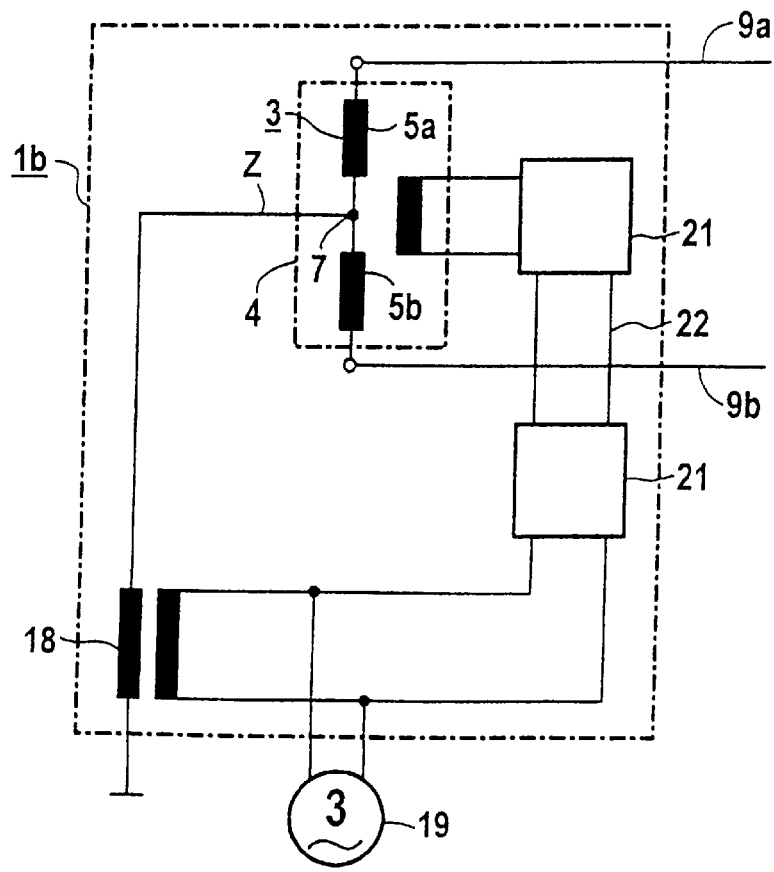
FIG. 2 is a block circuit diagram of a second transformer configuration.

FIG. 2 shows a second transformer configuration 1b, in which energy is to be fed in controlled fashion from a generator 19 into the two transmission lines 9a and 9b. The generator 19 is connected via a machine transformer 18 to the center tap 7, acting as a network node Z, of the winding 3. The tap 7, as already noted, is connected to both of the transmission lines 9a and 9b. The machine transformer 18 simultaneously acts here as an exciter transformer.

The auxiliary transformer 4 is supplied with energy via a converter configuration 21 acting as a control member. The converter configuration 21 preferably has an equal-energy intermediate circuit 22, in particular a current or voltage intermediate circuit. In this version, the entire exciter transformer is dispensed with, because this function is taken over by the machine transformer 18.

Figure 3:
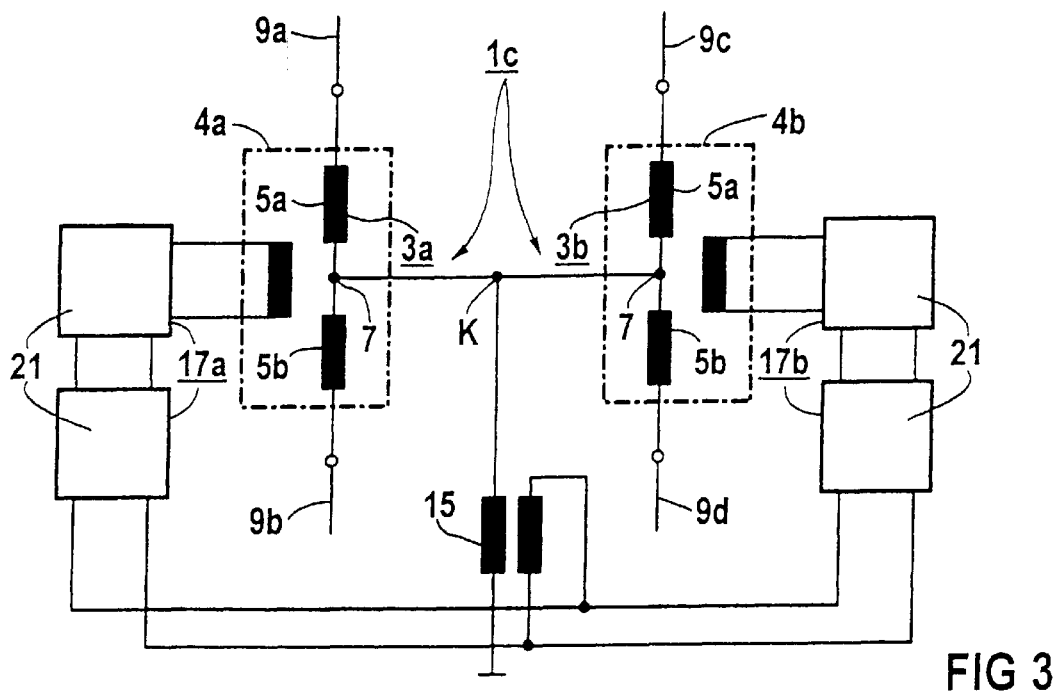
FIG. 3 is a block circuit diagram of a multiple transformer configuration.

FIG. 3 shows a third transformer configuration 1c in the form of a multiple configuration, in which the transmission lines 9a–9d, each coupled via a respective auxiliary transformer 4a and 4b, are connected in pairs via associated windings 3a, 3b to center taps 7 to form a network node K. There are accordingly six possible pairs of lines, in which the energy flow can be controlled, namely:

9a–9b, 9a–9c, 9a–9d, 9b–9c, 9b–9d, and 9c–9d.

Naturally multiple connections are also possible. This forms a quasi-tandem circuit, in which preferably each of the auxiliary transformers 4a, 4b have an associated control member 17a and 17b (each with a respective rectifier and converter). A favorable aspect of this version is that only one common exciter transformer 15 is needed. A version is also conceivable in which each auxiliary transformer 4a, 4b is assigned only one converter as a control member, and in which the two converters are connected to the exciter transformer 15 via a common equal-energy intermediate circuit supplied by a rectifier. In this way, one rectifier can be dispensed with.

The term center tap is understood here to be a tap at the winding that need not necessarily be directly "in the middle" or precisely at half the number of total windings. Depending on the requirements of the lines to be connected, the division may in fact be symmetrical or asymmetrical.

Figure 3A:
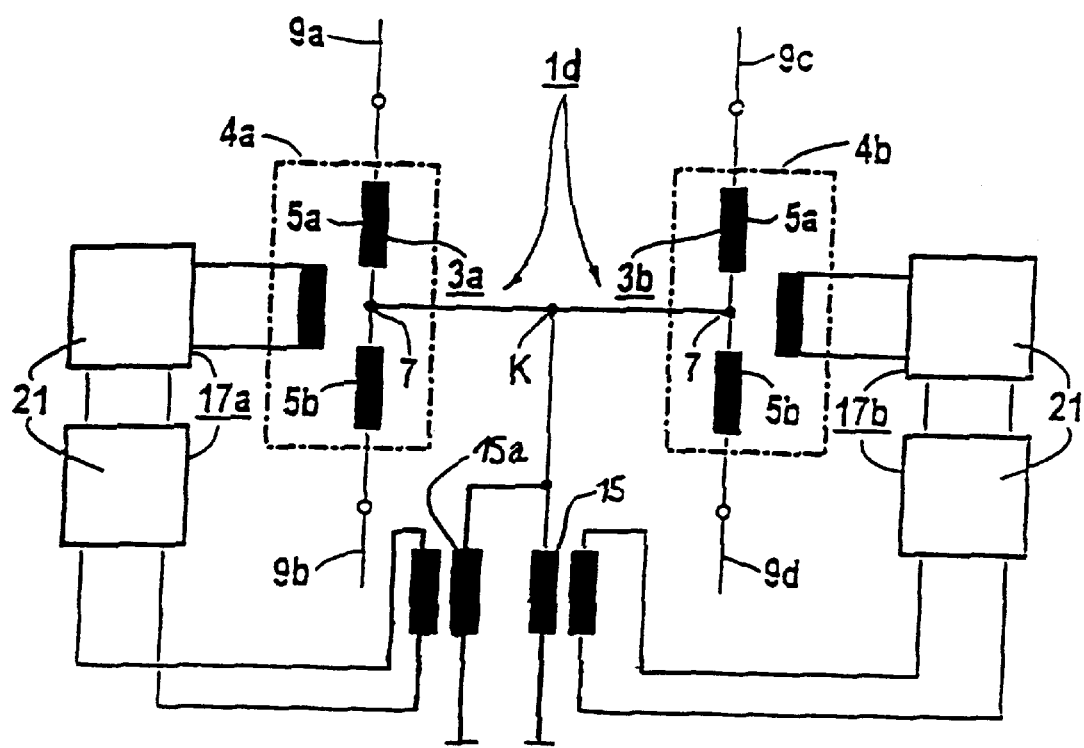
FIG. 3a is a block circuit diagram of the multiple transformer configuration having multiple exciter transformers.

FIG. 3a shows a further transformer configuration 1d which differs from the third transformer configuration 1c in that the additional transformers 4a, 4b are connected to separate exciter transformers 15a, 15, respectively.

Figure 4:
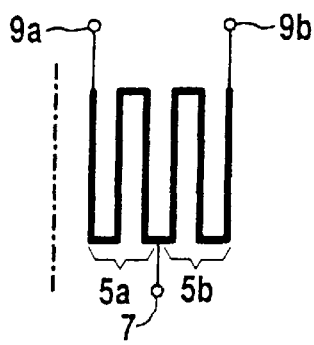
FIGS. 4 and 5 are diagrammatic views of winding embodiments of the transformers.
Figure 5:
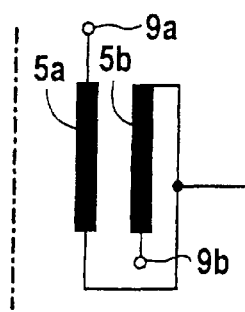

FIG. 4 to that end and by way of example shows a layered winding with 2n layers and a constant number of layer windings, in which the center tap 7 forms symmetrical partial windings 5a, 5b. A symmetrical embodiment of a coil winding might be connected as in FIG. 5, in which impermissible transverse stray flows are avoided through what there are tubular partial windings 5a, 5b.

It is understood that individual characteristics of the versions described can be combined selectively with one another without departing from the basic concept. The essential basic concept is that the auxiliary transformer has a structure divided into two parts, and two transmission lines can be connected simultaneously.

I claim:

1. In combination with transmission lines including a first transmission line and a second transmission line, a transformer configuration for feeding an additional voltage into the transmission lines, comprising:

an auxiliary transformer having a winding with a center tap being a network node, said center tap dividing said winding into a first partial winding and a second partial winding, said first partial winding connected in series with the first transmission line and said second partial winding connected in series with the second transmission line; and an exciter transformer supplying energy to said auxiliary transformer.

2. The transformer configuration according to claim 1, wherein the transmission lines further include a third transmission line and a fourth transmission line, and including a further auxiliary transformer having a further winding with a further center tap dividing said further winding into a further first partial winding and a further second partial winding, said further first partial winding connected in series with the third transmission line and said further second partial winding connected in series with the fourth transmission line, and said center tap connected to said further center tap forming said network node.

3. The transformer configuration according to claim 2, wherein said exciter transformer supplies energy to both said auxiliary transformer and said further auxiliary transformer.

4. The transformer configuration according to claim 3, including a first control member connected between said auxiliary transformer and said exciter transformer and a second control member connected between said further auxiliary transformer and said exciter transformer.

5. The transformer configuration according to claim 4, wherein said first control member and said second control member are converter configurations.

6. The transformer configuration according to claim 5, wherein said converter configurations each have an equal-energy intermediate circuit.

7. The transformer configuration according to claim 2, including a further exciter transformer for supplying energy to said further auxiliary transformer.

8. The transformer configuration according to claim 4, wherein said exciter transformer and said further exciter transformer each have a high-voltage side and said center tap and said further center tap are connected to said high-voltage side of said exciter transformer and said further exciter transformer, respectively.

9. The transformer configuration according to claim 2, wherein said exciter transformer has a high-voltage side and said center tap is connected to said high-voltage side.

10. The transformer configuration according to claim 7, including a first control member connected between said auxiliary transformer and said exciter transformer and a second control member connected between said further auxiliary transformer and said further exciter transformer.

11. The transformer configuration according to claim 10, wherein said first control member and said second control members are converter configurations.

12. The transformer configuration according to claim 11, wherein said converter configurations each have an equal-energy intermediate circuit.

13. The transformer configuration according to claim 2 wherein said winding and said further winding each have windings and said center tap and said further center tap are positioned to pickup approximately 50% of said windings, respectively.

14. The transformer configuration according to claim 1, wherein said exciter transformer is a machine transformer having a winding on a low-voltage side, and including a generator connected to said winding on said low-voltage side.

15. The transformer configuration according to claim 1, including a control member connected between said auxiliary transformer and said exciter transformer.

16. The transformer configuration according to claim 15, wherein said control member is a converter configuration.

17. The transformer configuration according to claim 16, wherein said converter configuration has an equal-energy intermediate circuit.

18. The transformer configuration according to claim 1, including a given number of phases and the transmission lines have a number of phases equal to said given number of phases.

19. The transformer configuration according to claim 1, wherein said winding has windings and said center tap is positioned to pickup approximately 50% of said windings.

20. The transformer configuration according to claim 1, wherein said winding has windings and said center tap is positioned to pickup 50% of said windings.

* * * * *